United States Patent [19]
Beretta et al.

[11] Patent Number: 5,891,549
[45] Date of Patent: Apr. 6, 1999

[54] SHEET-LIKE STRUCTURE WITH SURFACE PROTRUSIONS FOR PROVIDING SPACING, GRIP-ENHANCING, DRAINING ELEMENTS AND THE LIKE

[75] Inventors: Mario Beretta, Sirtori; Pierluigi Maggioni, Barzano', both of Italy

[73] Assignee: Tenax S.p.A., Vigano', Italy

[21] Appl. No.: 936,423

[22] Filed: Sep. 24, 1997

[30] Foreign Application Priority Data

Oct. 15, 1996 [IT] Italy .................................. MI96A2140

[51] Int. Cl.⁶ .................................. B32B 3/06; A44B 1/04
[52] U.S. Cl. .......................... 428/100; 428/101; 428/137; 428/172; 24/452
[58] Field of Search .............................. 428/99, 100, 133, 428/156, 101, 120, 172, 131, 137; 24/442, 452

[56] References Cited

U.S. PATENT DOCUMENTS

| | | | |
|---|---|---|---|
| 3,932,090 | 1/1976 | Brumlik | 425/381 |
| 4,794,028 | 12/1988 | Fischer | 428/100 |
| 4,984,339 | 1/1991 | Provost et al. | 24/452 |
| 5,326,612 | 7/1994 | Goulait | 428/100 |
| 5,348,788 | 9/1994 | White | 428/131 |
| 5,368,549 | 11/1994 | McVicker | 428/100 |
| 5,382,462 | 1/1995 | Pacione | 428/100 |

FOREIGN PATENT DOCUMENTS

| | | |
|---|---|---|
| 0 645 486 | 3/1995 | European Pat. Off. . |
| 7 901 732 | 9/1979 | Netherlands . |
| 2 252 985 | 8/1992 | United Kingdom . |

OTHER PUBLICATIONS

Patent Abstracts of Japan vol. 009, No. 306 (C-317), 3 Dec. 1985 & JP 60 143803 A (Asahi Kasei Kogyo KK), 30 Jul. 1985, * abstract *.

*Primary Examiner*—Donald Loney
*Attorney, Agent, or Firm*—Guido Modiano; Albert Josif

[57] ABSTRACT

A sheet-like structure with surface protrusions for he provision of spacing elements, grip-enhancing elements, draining elements and the like, comprising an extruded sheet-like element which has, on at least one face, a plurality of peduncles which are formed monolithically with the sheet-like element during the extrusion thereof and have a solid transverse cross-section.

14 Claims, 4 Drawing Sheets

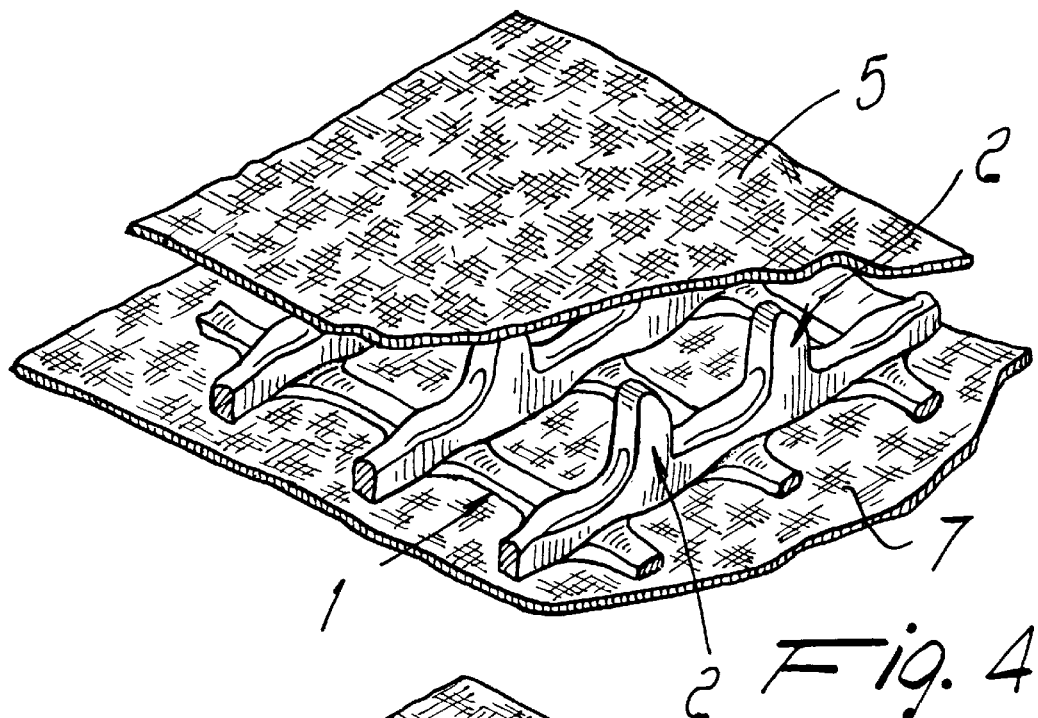
Fig. 4
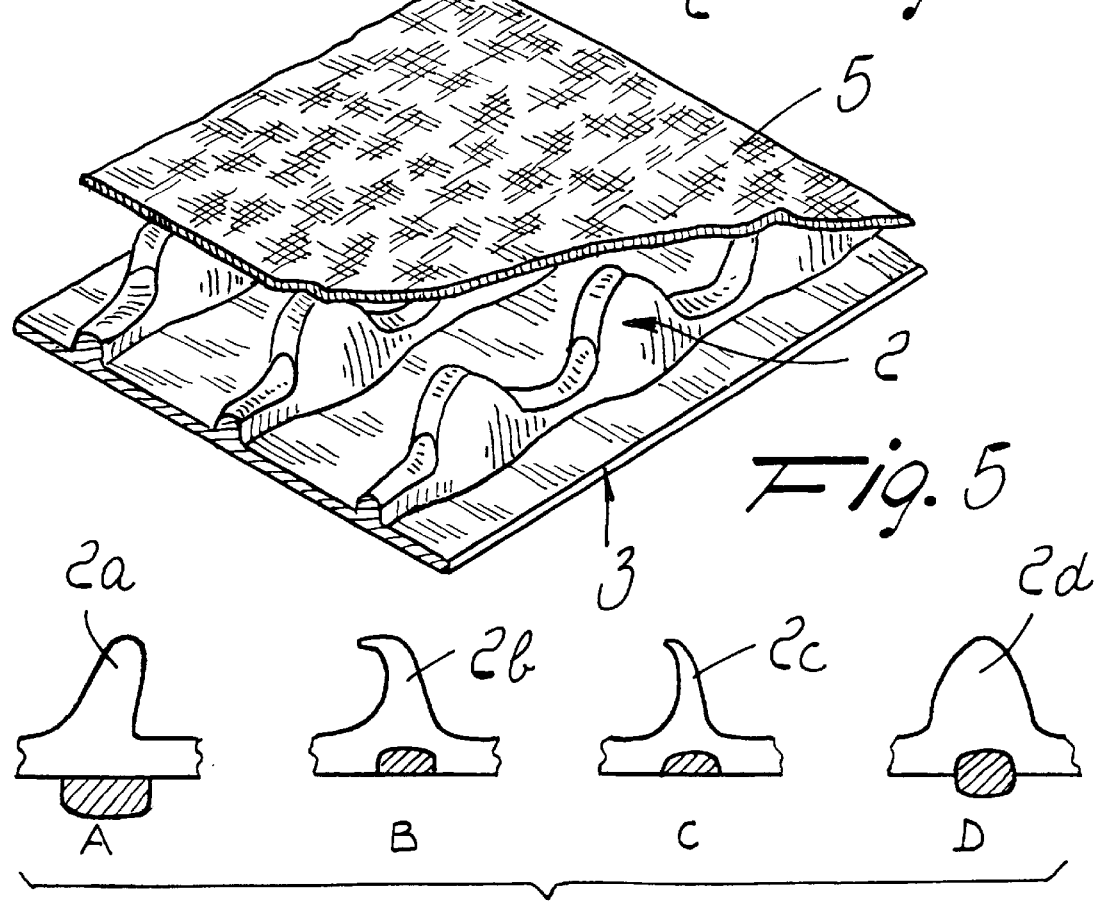
Fig. 5
Fig. 6

SHEET-LIKE STRUCTURE WITH SURFACE PROTRUSIONS FOR PROVIDING SPACING, GRIP-ENHANCING, DRAINING ELEMENTS AND THE LIKE

BACKGROUND OF THE INVENTION

The present invention relates to a sheet-like structure with surface protrusions for providing spacing, grip-enhancing, draining elements and the like.

It is known that spacing or draining elements are already commercially available which are provided by means of continuous or perforated sheets, calendered or thermoformed so as to have protrusions or studs on their surface; reticular products with two or more sets of superimposed filaments are also used mostly for drainage purposes.

Both the sheets and the net-like products can be coupled to woven materials, non-woven fabrics or membranes.

Conventional solutions, however, entail several drawbacks: particularly, continuous or perforated sheets shaped by calendering or thermoforming have the drawback that they are fragile and furthermore difficult to compress, owing to the internal flimsiness of the protrusions; it is also necessary to perform significant modifications of the manufacturing equipment if the product is to be modified by changing the number or distribution of the protrusions.

Use of these products as drainage elements is furthermore not particularly favorable, since there is a considerable presence of spacing material because the studs cannot be obtained with a configuration having a very small base; moreover, the studs are subjected, under stress, to a gradual compression which ultimately drastically reduces the draining ability.

Another drawback is furthermore constituted by the fact that the studs molded on the sheet or net must be placed at a relatively significant distance, so that in case of coupling with fabrics said fabric can curve or form arcs in the regions where it is not supported by the studs.

Another problem is furthermore constituted by the fact that calendering of reticular or perforated material can be performed only starting from material with very small openings, in order to avoid compromising the strength of the structure and making production difficult.

It should also be noted that the perforation of a product which has already been calendered to obtain a reticular configuration is unfeasible, both because the method is uneconomical and because the resulting product would be extremely fragile.

The use of products produced with nets having two or more layers of filaments as draining elements is also not particularly advantageous, since the presence of the filaments transversely to the path along which the fluid passes entails a drastic reduction of its draining characteristics.

Moreover, these nets with multiple layers of filaments, when they are not coupled to membranes and/or fabrics, owing to their non-laminar structure, can damage or bite into delicate surfaces, such as sheaths and membranes which are superimposed on it.

SUMMARY OF THE INVENTION

The aim of the present invention is to eliminate the above drawbacks by providing, during stretching, a sheet-like structure with surface protrusions for forming spacing elements, grip-enhancing elements, draining elements and the like, in which it is possible to provide protrusions or projections which can be shaped in various manners according to the contingent requirements without thereby having to perform considerable replacements in the production equipment.

Within the scope of this aim, a particular object of the present invention is to provide a sheet-like structure in which the protrusions have a high compressive mechanical strength so that they are ideal for the provision of spacers, furthermore allowing to significantly reduce the base cross-section, providing products which have very high-level draining characteristics.

Another important aspect is furthermore constituted by the fact that the protrusions can have different configurations according to the particular use to which the product is subjected.

Another object of the present invention is to provide a sheet-like structure in which the provision of the protrusion or peduncle can be performed without waste of any kind.

Another object of the present invention is to provide a sheet-like structure which can be easily obtained starting from commonly commercially available elements and materials and furthermore allows to produce a product which in addition to having improved functional characteristics is also extremely competitive from a purely economical point of view.

This aim, these objects and others which will become apparent hereinafter are achieved by a sheet-like structure with surface protrusions for the provision of spacing elements, grip-enhancing elements, draining elements and the like, characterized in that it comprises an extruded sheet-like element which has, on at least one face thereof, a plurality of peduncles which are formed monolithically with said sheet-like element during the extrusion thereof and have a solid transverse cross-section.

BRIEF DESCRIPTION OF THE DRAWINGS

Further characteristics and advantages of the present invention will become apparent from the following detailed description of a preferred but not exclusive embodiment of a sheet-like structure with surface protrusions for the provision of spacing elements, grip-enhancing elements, draining elements and the like, illustrated only by way of non-limitative example in the accompanying drawings, wherein:

FIG. 4 is a perspective view of a reticular structure coupled to two fabrics, according to the present invention;

FIG. 5 is a perspective view of a membrane with peduncles, coupled to a fabric, according to the present invention;

FIG. 6 is a schematic view of possible different embodiments of the peduncles, according to the present invention;

DESCRIPTION OF THE PREFERRED EMBODIMENTS

Figure 1:
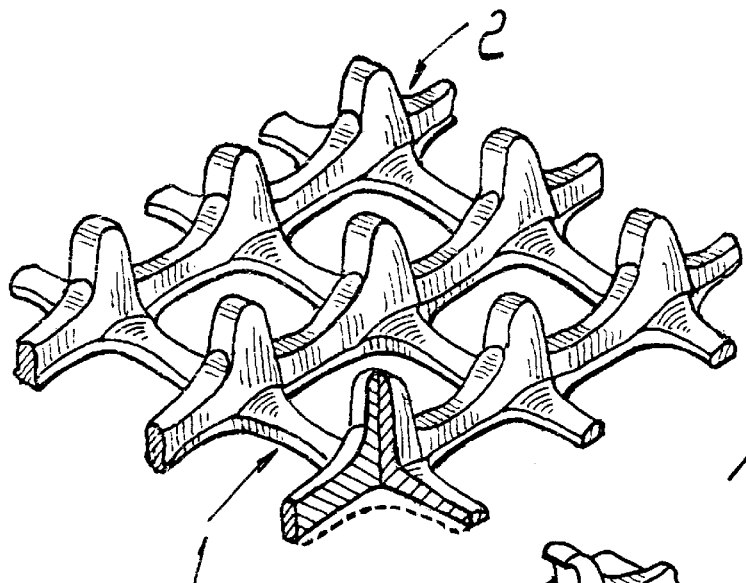
FIG. 1 is a perspective view of the sheet-like structure according to the present invention, executed in the form of a reticular element with peduncles.

With reference to the above figures, the sheet-like structure with surface protrusions for the provision of spacing elements, grip-enhancing elements, draining elements and the like, according to the present invention, is constituted by an extruded sheet-like element which can assume various shapes; in particular, as shown in FIG. 1, the sheet-like element can be provided by means of an extruded net generally designated by the reference numeral 1.

An important particularity is constituted by the fact that a plurality of peduncles, generally designated by the reference numeral 2, is provided on at least one face of the sheet-like element, which is constituted by the net 1 in the specific case; also said peduncles are provided by extrusion during the extrusion of the net.

The peduncles 2, which can assume various shapes, as will become apparent hereinafter, have the characteristic that they have a solid cross-section, i.e., they have no internal cavities, so that they have a considerable mechanical strength.

Figure 2:
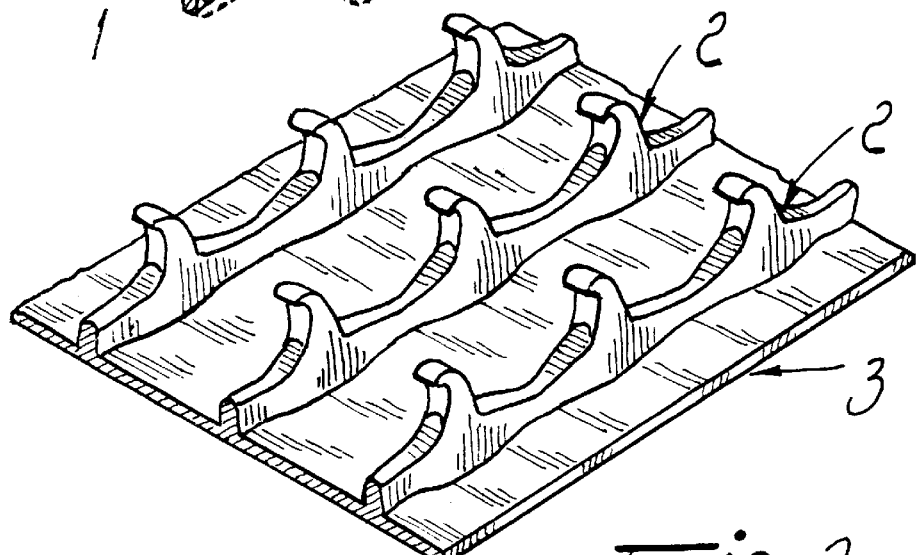
FIG. 2 is a schematic perspective view of a membrane with peduncles, according to the present invention.

As shown in FIG. 2, it is possible to provide the sheet-like structure so as to obtain a sheet-like element, generally designated by the reference numeral 3, which is also extruded and is constituted by a laminar element on which peduncles are provided, again generally designated by the reference numeral 2.

Conceptually, the two solutions are similar; the difference is purely in terms of application, since for some uses it is advisable to have a sheet-like element constituted by a net, whilst for other applications it is advisable to have the sheet-like element constituted by a continuous lamina.

Figure 3:
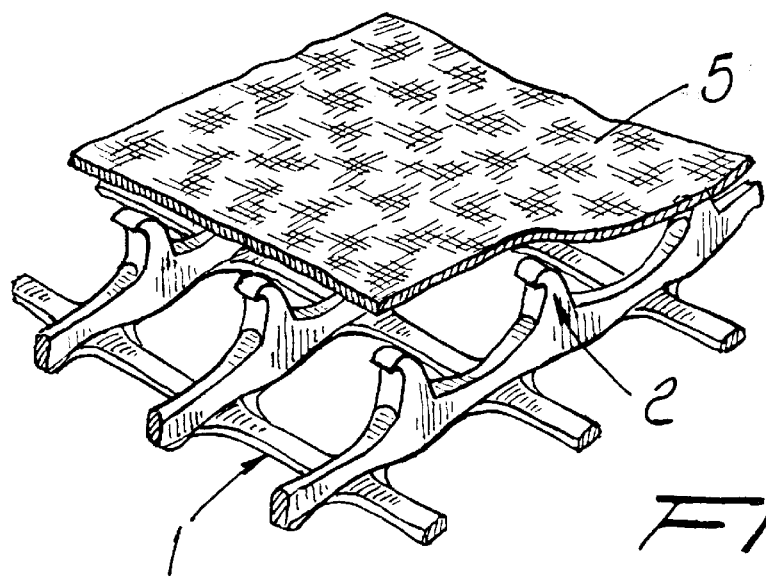
FIG. 3 is a perspective view of a reticular structure coupled to a fabric, according to the present invention.

A layer of fabric or non-woven fabric 5 can be applied to the peduncles 2, as shown in FIGS. 3, 4 and 5, by gluing or with other methods.

Optionally, as shown in FIG. 4, it is possible to provide a second layer of fabric, designated by the reference numeral 7, which can be applied to the other side.

The shape of the peduncles 2, as shown in FIG. 6, depends strictly on the kind of application to be provided; in the case of sheet-like structures used as spacing elements, it is in fact recommendable to have a peduncle, designated by the reference numeral 2a, which has a relatively wide cross-section, so as to have a considerable compressive strength; the cross-section is of course a direct function of the height and accordingly of the space that must be affected by the spacing element.

In the case of a sheet-like structure to be coupled to a fabric, it is recommendable to use a peduncle, designated by the reference numeral 2b, which has a curved end in order to offer a larger surface for contact with the non-woven fabric or the like, thus ensuring more effective coupling.

If one wishes to produce a grip-enhancing surface, it is recommendable to provide a peduncle 2c which has a more pointed shape, which allows to achieve a considerable grip-enhancing effect.

If the structure of sheet-like elements is used in protection systems, it is recommendable to give the peduncle a cusp-like shape, designated by the reference numeral 2d in FIG. 6.

With the above-described structure it is thus possible to very quickly and simply diversify both the size of the peduncles and their mutual position with respect to the reticular structure from which they protrude; in particular, it is recommendable to place the peduncles at the nodes of the reticular structure if one wishes to achieve better compressive strengths whilst having a good overall flexibility, whilst the peduncle should be arranged on the filament of the reticular mesh when greater flexural rigidity of the reticular structure is intended.

The peduncles are advantageously distributed so that they are aligned along a plurality of lines and can have a distance and a pitch which can vary in any manner, according to all the contingent requirements; in any case, the flexibility of the production system allows to always have an optimum combination of peduncle and mesh.

The flexibility of the system also allows to vary, during extrusion, the thickness of the membrane according to the use for which the pedunculate product is meant; in other words, for impermeabilization and protection systems it is preferable to use very thick membranes, whilst lower thicknesses allow to produce products which flex more easily.

In drainage systems, the continuous membrane offers the advantage of ensuring impermeableness and perfect conveyance of fluids, whilst in spacing systems the presence of a continuous membrane provides a dividing element and a continuous barrier which easily protects the element to be spaced.

Figure 7:
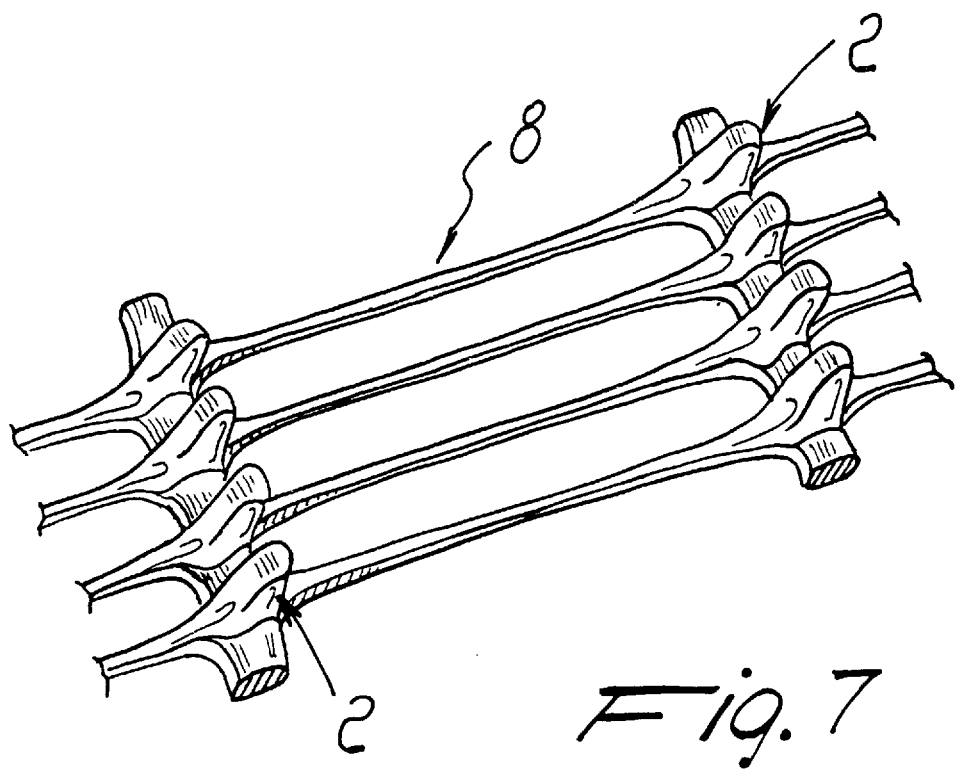
FIG. 7 is a perspective view of a mono-oriented sheet-like structure, according to the present invention.
Figure 8:
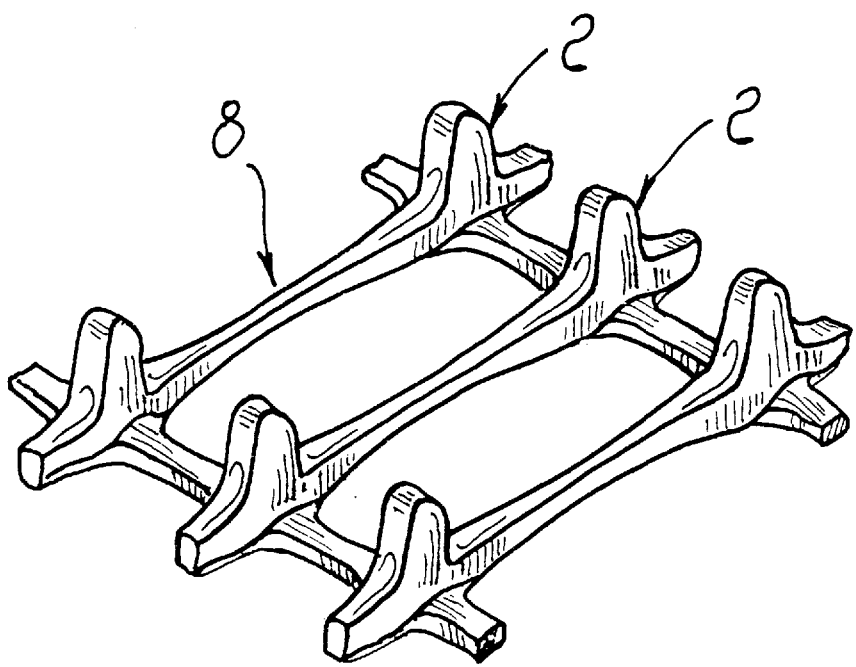
FIG. 8 is a schematic perspective view of a mono-oriented sheet-like structure, according to the present invention.
Figure 9:
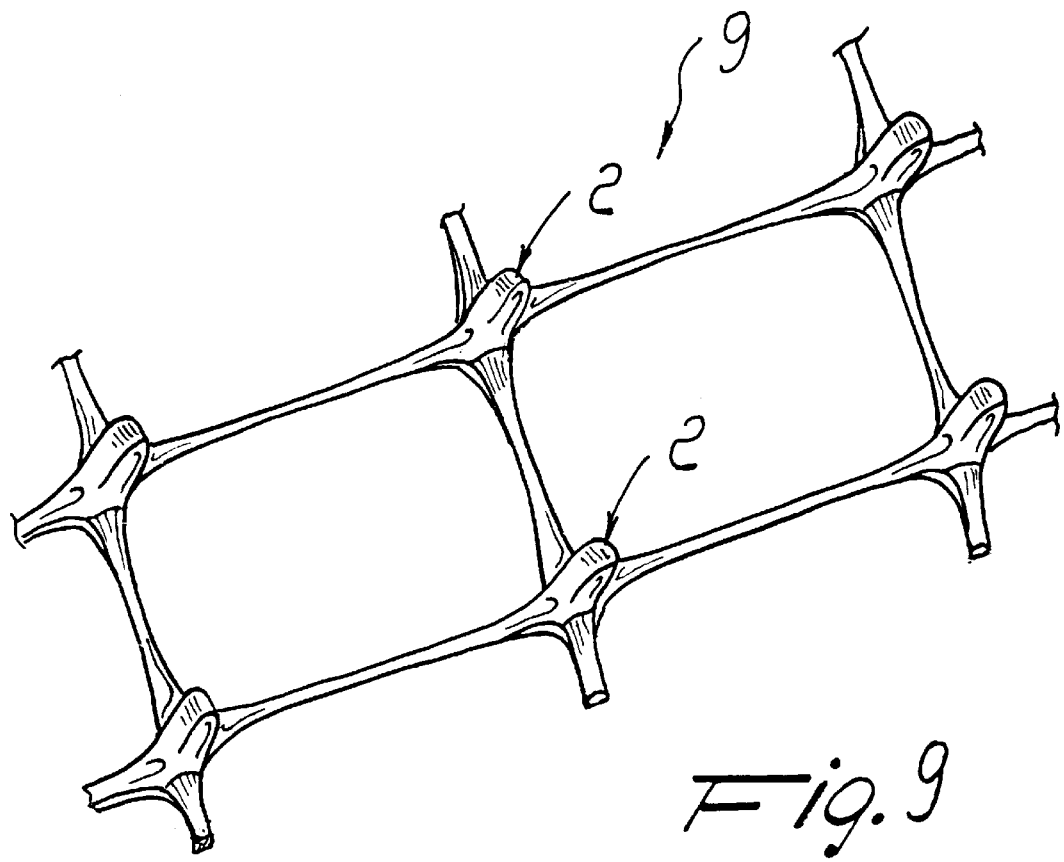
FIG. 9 is a perspective view of a bi-oriented sheet-like structure, according to the present invention.
Figure 10:
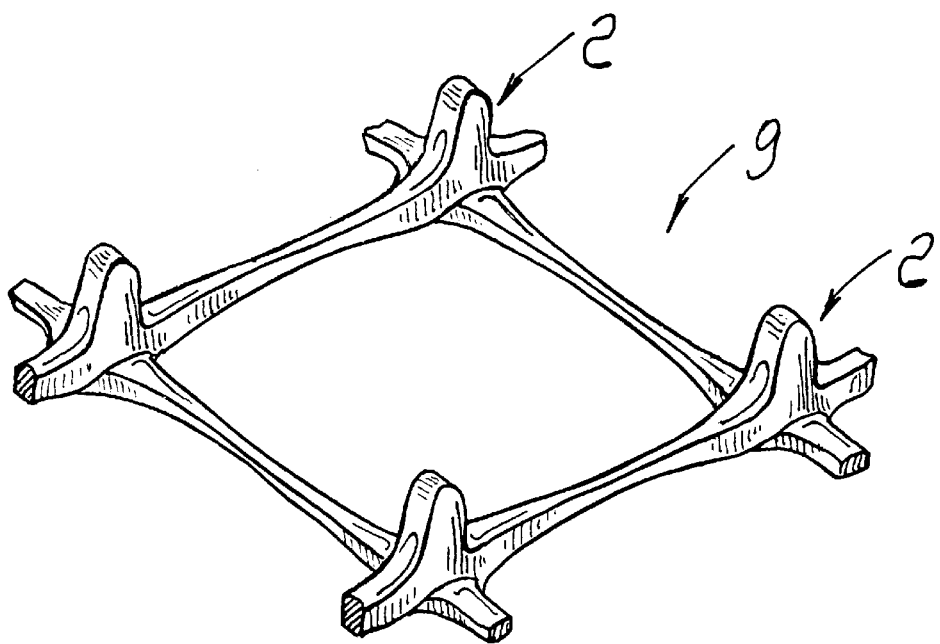
FIG. 10 is a schematic perspective view of a mesh of the bi-oriented sheet-like structure, according to the present invention.

It should be added to the above that in the case of a reticular structure it is possible to obtain, as shown in FIGS. 7 and 8, a sheet-like element, designated by the reference numeral 8, in which the meshes of the net are oriented in one or both directions, thus obtaining a bi-oriented product designated by the reference numeral 9, as shown in FIGS. 9 and 10.

Stretching the reticular product combines the advantages of increasing the strength of the filaments and of significantly increasing the flexibility of the product, widening the meshes and consequently reducing the weight per surface unit while maintaining the presence of pins which are substantially not affected by the stretching action.

The single- or bi-oriented product is advantageously used in wrapping and retention systems and in grip and containment systems, taking advantage of the fact that the presence of the various peduncles provides a grip-enhancing element and that if the sheet-like structure is used as a retention system, by wrapping the sheet-like structure so that it overlaps itself, the peduncles produce a self-locking action which keeps the parts of the overlapping reticular structure joined together.

It should also be noted that it is optionally possible to provide two or more interconnected layers of net which have the above-described peduncles on one of the outer surfaces, thus obtaining a product which is particularly advantageous in protection, spacing and highly draining systems.

The provision of the peduncles 2 directly and monolithically with the sheet-like element 1 (or 3) allows to provide a product which, both in the reticular form and in the continuous-membrane form, can be shaped and folded easily whilst maintaining a high concentration of peduncles.

It should be added to the above that the provision of the peduncles 2 directly and monolithically with the sheet-like element 1 (or 3) allows to have a sheet-like element which is completely smooth on the peduncle-free side, so that the product can be superimposed on delicate surfaces, such as coverings or membranes, with no danger of damaging them, whilst in the solutions of the prior art any protrusions obtained by calendering or thermoforming inevitably produce a hollow or in any case a void at the protrusion on the face of the membrane.

From the above description it is thus evident that the present invention achieves the intended aim and objects; in particular, the fact is stressed that the provision of a sheet-like structure with peduncles formed directly during the extrusion of the sheet-like element leads to a product which is particularly innovative and highly versatile, since it can easily adapt to all contingent requirements by means of modifications which can be quickly and easily introduced during the production of the sheet-like structure.

The invention thus conceived is susceptible of numerous modifications and variations, all of which are within the scope of the inventive concept.

All the details may furthermore be replaced with other technically equivalent elements.

In practice, the materials employed, as well as the contingent shapes and dimensions, may be any according to requirements.

What is claimed is:

1. A sheet structure in combination with a membrane, said sheet structure being provided with surface protrusions to which said membrane is connected providing a spacing effect for the membrane, the sheet structure comprising an extruded sheet element which has a main base layer and, on at least one face of said main base layer, a plurality of peduncles which are formed monolithically with said main base layer during the extrusion of said sheet structure and which have a solid transverse cross-section and which protrude from said main base layer, said plurality of peduncles having contact coupling surface portions which are spaced distally from said main base layer maximally with respect to non-contact non-coupling surface portions of said plurality of peduncles such that said contact coupling surface portions are arranged more distally from said main base layer than said non-contact non-coupling surface portions, and said membrane having a surface which is arranged in contact with said contact coupling surface portions of said plurality of peduncles and which is coupled with said contact coupling surface portions of said plurality of peduncles for providing said spacing effect for the membrane from the main base layer of the sheet structure.

2. The combination of claim 1, wherein said main base layer is constituted by a reticular element.

3. The combination of claim 1, wherein said main base layer is constituted by a continuous lamina.

4. The combination of claim 1, wherein said peduncles are mutually aligned in substantially parallel rows.

5. The combination of claim 1, wherein said peduncles have an elongated shape whose cross-section decreases from a coupling region toward a free end of each of said peduncles.

6. The combination of claim 1, wherein said peduncles have a curved end.

7. The combination of claim 1, wherein said peduncles have an elongated shape with a tapering point.

8. The combination of claim 1, wherein said peduncles have a substantially cusp-like cross-section.

9. The combination of claim 1, wherein said membrane is a first layer of fabric which is coupled to said contact coupling surface portions of said peduncles.

10. The combination of claim 9, further comprising a second layer which is applied to said main base layer on an opposite face with respect to the face of said main base layer provided with said peduncles.

11. The combination of claim 1, wherein said main base layer is constituted by structure, said peduncles being arranged at nodes of said reticular structure.

12. The combination of claim 1, wherein said main base layer is constituted by a reticular structure, said peduncles being arranged in an intermediate portion of a mesh of said reticular structure.

13. The combination of claim 1, wherein said main base layer is constituted by a mono-oriented reticular element.

14. The combination of claim 1, wherein said main base layer is constituted by a bi-oriented reticular structure.

* * * * *